US 12,339,785 B2

(12) United States Patent
Pedretti et al.

(10) Patent No.: US 12,339,785 B2
(45) Date of Patent: Jun. 24, 2025

(54) GRAPH CACHE

(71) Applicant: Hewlett Packard Enterprise Development LP, Spring, TX (US)

(72) Inventors: Giacomo Pedretti, San Francisco, CA (US); Dejan S. Milojicic, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 45 days.

(21) Appl. No.: 18/526,843

(22) Filed: Dec. 1, 2023

(65) Prior Publication Data
US 2025/0181513 A1   Jun. 5, 2025

(51) Int. Cl.
*G06F 12/08* (2016.01)
*G06F 12/0893* (2016.01)

(52) U.S. Cl.
CPC ................. *G06F 12/0893* (2013.01)

(58) Field of Classification Search
CPC ............. G06F 12/0802; G06F 12/0893; G06F 2212/60; G06F 2212/302; G06F 17/30277; G06F 16/24552; G06F 16/24542; G06F 16/9024
See application file for complete search history.

(56) References Cited

U.S. PATENT DOCUMENTS

| | | | | |
|---|---|---|---|---|
| 6,493,790 B1 * | 12/2002 | Khieu | ............. | G11C 15/00 711/108 |
| 7,606,974 B2 * | 10/2009 | Dai | ............. | G06F 12/0842 712/225 |
| 10,802,807 B1 | 10/2020 | Hsu et al. | | |
| 10,977,018 B1 | 4/2021 | Hwang et al. | | |
| 11,036,546 B1 | 6/2021 | Bhandari et al. | | |
| 11,108,644 B1 | 8/2021 | Mkrtchyan et al. | | |
| 11,113,030 B1 | 9/2021 | Monga et al. | | |
| 11,270,051 B1 | 3/2022 | Suresh et al. | | |
| 11,301,295 B1 | 4/2022 | Gupta et al. | | |
| 2020/0371761 A1 | 11/2020 | Gupta et al. | | |
| 2021/0067549 A1 | 3/2021 | Chen et al. | | |
| 2022/0114103 A1 * | 4/2022 | Miller | ............. | G06F 12/0875 |

(Continued)

FOREIGN PATENT DOCUMENTS

WO   WO 2021/120707   *   6/2021

OTHER PUBLICATIONS

Challapalle, N. et al., "GaaS-X: Graph Analytics Accelerator Supporting Sparse Data Representation using Crossbar Architectures," 2020 ACM/IEEE 47th Annual International Symposium on Computer Architecture (ISCA), Valencia, Spain, May 30-Jun. 3, 2020, doi: 10.1109/ISCA45697.2020.00044, pp. 433-445.

(Continued)

*Primary Examiner* — Tracy C Chan
(74) *Attorney, Agent, or Firm* — Slater Matsil, LLP

(57) ABSTRACT

A cache is used for efficiently storing a graph structure. The graph cache may be used in a computing system to accelerate processing of a graph by a graph neural network, and is different than a general-purpose memory of the computing system. Embeddings for the nodes of a graph are stored in the memory of the computing system, while the structure of the graph is stored in the graph cache. The graph cache may include a content addressable memory array, which may be suitable for efficiently representing a graph structure.

20 Claims, 6 Drawing Sheets

(56) References Cited

U.S. PATENT DOCUMENTS

| | | | |
|---|---|---|---|
| 2022/0156322 A1 | 5/2022 | Singh et al. | |
| 2023/0245210 A1* | 8/2023 | Yang | G06N 3/048 |
| 2024/0152754 A1* | 5/2024 | Leskovec | G06N 20/00 |

OTHER PUBLICATIONS

Mao, R. et al., "ReRAM-based graph attention network with node-centric edge searching and hamming similarity," 2023 60th ACM/IEEE Design Automation Conference (DAC), Jul. 9-13, 2023, San Francisco, CA, doi: 10.1109/DAC56929.2023.10247735, 6 pages.

Mohan, N. et al., "Design Techniques and Test Methodology for Low-Power TCAMs," IEEE Transactions on Very Large Scale Integration (VLSI) Systems, vol. 14, No. 6, Jun. 2006, doi: 10.1109/TVLSI.2006.878206, pp. 573-586.

* cited by examiner

GRAPH CACHE

BACKGROUND

Graph neural networks (GNNs) are a class of machine learning algorithms designed to process and analyze data represented as graphs. They have gained prominence in various domains, such as traffic analysis, social networks, recommendation systems, biology, etc. GNNs operate by aggregating information from neighboring nodes in a graph, enabling them to identify relationships and patterns within the data. A GNN includes multiple layers, each of which refines the node embeddings of a graph through a combination of node features and information from neighboring nodes. GNNs are useful for tasks such as node classification, link prediction, and graph classification.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
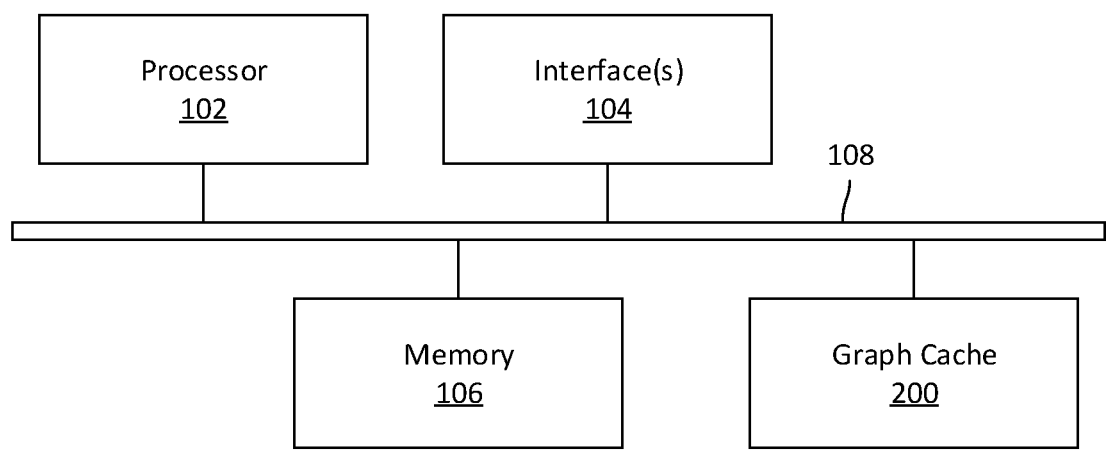
FIG. 1 is a block diagram of a computing system, according to some implementations.

The following disclosure provides many different examples for implementing different features. Specific examples of components and arrangements are described below to simplify the present disclosure. These are, of course, merely examples and are not intended to be limiting.

A graph represents the relations between a collection of entities. Specifically, a graph includes nodes (corresponding to the entities) and edges (corresponding to the relations between the entities). Each of these elements of a graph may include an embedding. A node embedding includes one or more pieces of information about the node.

A graph neural network (GNN) includes multiple layers. When processing a graph with a GNN, the network operates in multiple iterations, where each layer updates the embeddings of nodes in the graph. At each layer, the GNN aggregates information from neighboring nodes, updates the embedding of each node, and then moves to the next layer. This process continues for a fixed number of layers or until a convergence criterion is met.

The structure of a graph remains constant throughout processing with a GNN. In other words, the graph structure (represented by the edges connecting nodes) does not change as node embeddings are updated. One way to represent a graph structure for processing is with an adjacency matrix. However, adjacency matrices may consume a large amount of memory and may be sparely populated—particularly for large graph structures—leading to inefficient memory utilization.

The present disclosure describes a cache for efficiently storing a graph structure, also referred to as a "graph structure cache" or simply a "graph cache." The graph structure cache may be used in a computing system to accelerate processing of a graph by a GNN. The graph cache is different than a general-purpose memory of the computing system. Embeddings for the nodes of a graph are stored in the memory of the computing system, while the structure of the graph is stored in the graph cache. The graph cache may include a content addressable memory (CAM) array, which may be suitable for efficiently representing a graph structure. Notably, a graph structure may be more efficiently represented in a CAM array than in an adjacency matrix. Thus, the amount of memory used by the computing system for processing a graph with a GNN may be reduced.

In some implementations, the graph cache includes a content addressable memory (CAM) array, which is used to store values for the edges of a graph structure, and a random-access memory (RAM) array, which is used to store memory addresses for embeddings of neighbor nodes of the graph structure. The memory addresses are locations of a memory of the computing system. During processing with a GNN, an identifier for a target node of a graph structure is provided to the CAM array. Respective word lines of the RAM array are activated by the CAM array, which causes the graph cache to output the memory addresses for the embeddings of the neighbor nodes of the target node. The embeddings of the neighbor nodes may then be directly accessed at the memory addresses of the computing system's memory. The graph cache may also include a multiple match resolver (MMR). When multiple match lines of the CAM array are activated, the multiple match resolver may serially activate the corresponding word lines of the RAM array, so that the corresponding memory addresses are serially output by the RAM array.

FIG. 1 is a block diagram of a computing system 100 that can be used to process a graph with a GNN, according to some implementations. The computing system 100 may be implemented in an electronic device. Examples of electronic devices include servers, desktop computers, laptop computers, mobile devices, gaming systems, and the like.

The computing system 100 may be utilized in any data processing scenario, including stand-alone hardware, mobile applications, or combinations thereof. Further, the computing system 100 may be used in a computing network, such as a public cloud network, a private cloud network, a hybrid cloud network, other forms of networks, or combinations thereof. In one example, the methods provided by the computing system 100 are provided as a service over a network by, for example, a third party. The computing system 100 may be implemented on one or more hardware platforms, in which the modules in the system can be executed on one or more platforms. Such modules can run on various forms of cloud technologies and hybrid cloud technologies or be offered as a Software-as-a-Service that can be implemented on or off a cloud.

To achieve its desired functionality, the computing system 100 includes various hardware components. These hardware components may include a processor 102, one or more interface(s) 104, a memory 106, and a graph cache 200. The hardware components may be interconnected through a number of busses and/or network connections. In one example, the processor 102, the interface(s) 104, the memory 106, and the graph cache 200 may be communicatively coupled via a bus 108.

The processor 102 retrieves executable code from the memory 106 and executes the executable code. The executable code may, when executed by the processor 102, cause the processor 102 to implement any functionality described herein. The processor 102 may be a microprocessor, an application-specific integrated circuit, a microcontroller, or the like.

The interface(s) 104 enable the processor 102 to interface with various other hardware components, external and internal to the computing system 100. For example, the interface(s) 104 may include interface(s) to input/output devices, such as, for example, a display device, a mouse, a keyboard, etc. Additionally or alternatively, the interface(s) 104 may include interface(s) to an external storage device, or to a number of network devices, such as servers, switches, and routers, client devices, other types of computing devices, and combinations thereof.

The memory 106 may include various types of memory, including volatile and nonvolatile memory. For example, the memory 106 may include Random-Access Memory (RAM), Read-Only Memory (ROM), a Hard Disk Drive (HDD), and/or the like. Different types of memory may be used for different data storage needs. For example, in certain examples the processor 102 may boot from ROM, maintain nonvolatile storage in an HDD, execute program code stored in RAM, and store data under processing in RAM. The memory 106 may include a non-transitory computer readable medium that stores instructions for execution by the processor 102. One or more modules within the computing system 100 may be partially or wholly embodied as software and/or hardware for performing any functionality described herein. The memory 106 may include a general-purpose memory used to store data for the processor 102.

The graph cache 200 is an accelerator for processing a graph with a GNN. The graph cache 200 is different than the processor 102 and the memory 106, and specifically, is different than cache(s) of the processor 102 and the memory 106. Additionally, the architecture of the graph cache 200 is different than that of the memory 106. In some implementations, the graph cache 200 includes a content addressable memory (CAM) array and a random-access memory (RAM) array. The CAM array may be programmed with values corresponding to the edges of a graph structure. Thus, a graph structure may be stored in the CAM array. A CAM array may be able to store a graph structure more efficiently than general-purpose memory (e.g., the memory 106). Accordingly, use of the graph cache 200 may improve the efficiency of the computing system 100.

As subsequently described in greater detail, the graph cache 200 may be used by the processor 102 to accelerate processing of a graph with a GNN. The processor 102 may store a structure for a graph in the graph cache 200, and also store node embeddings of the graph in the memory 106. During processing, the processor 102 may update the embedding of a target node by aggregating the embeddings of neighbor nodes that are adjacent to the target node in the graph structure. The processor 102 may obtain the embeddings of the neighbor nodes by using the graph cache 200. Specifically, the processor 102 may provide an identifier for the target node to the graph cache 200. In response, the graph cache 200 returns the memory addresses for the embeddings of the neighbor nodes to the processor 102. The memory addresses are locations of the memory 106. The processor 102 may then directly access the embeddings of the neighbor nodes (from the memory 106) at the memory addresses provided by the graph cache 200. Thus, the graph cache 200 is used for a lookup operation, in which the memory addresses for the neighbor embeddings may be looked up in one shot based on the target node identifier.

Figure 2:
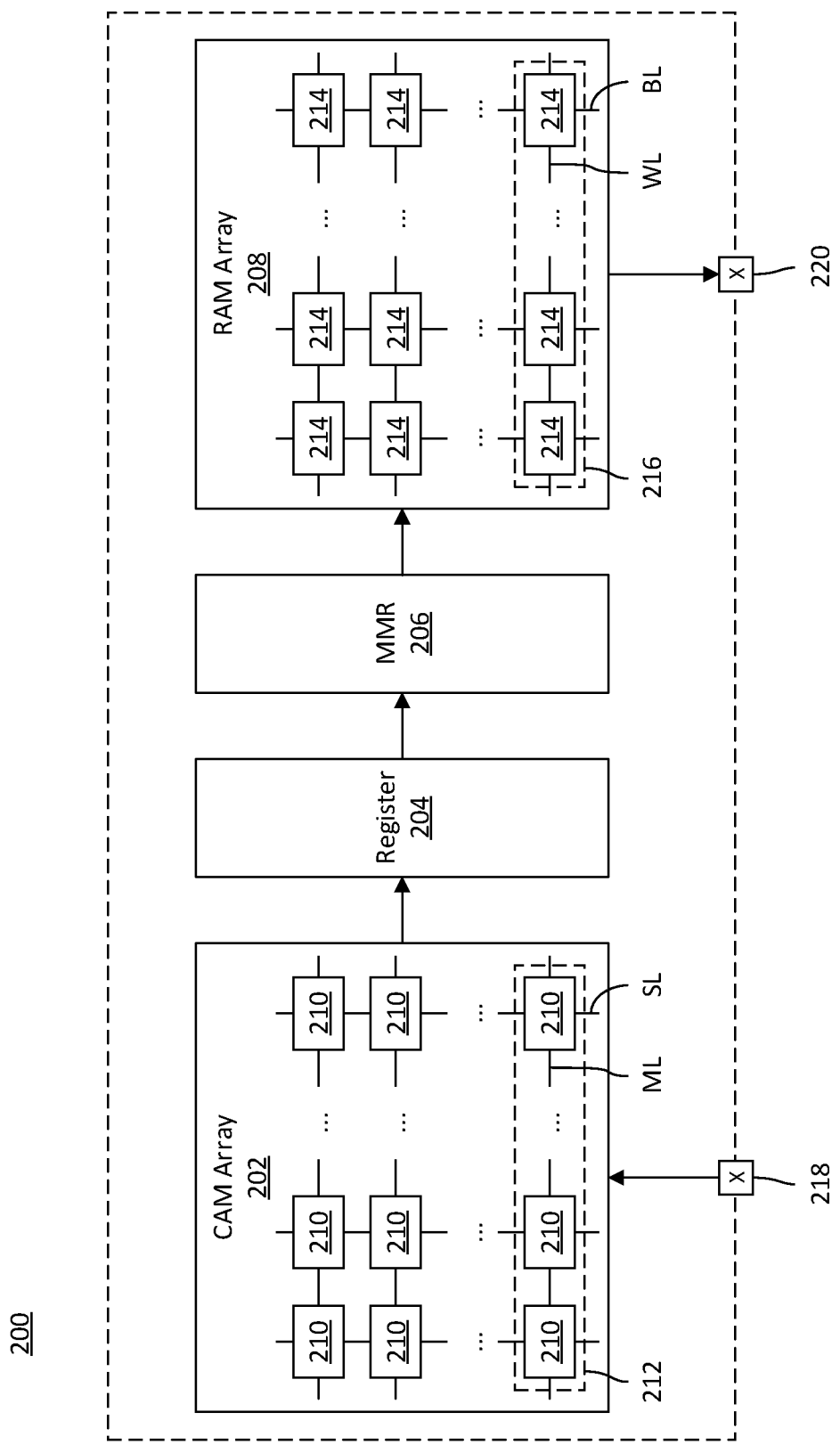
FIG. 2 is a block diagram of graph cache, according to some implementations.

FIG. 2 is a block diagram of a graph cache 200, according to some implementations. An example implementation of the graph cache 200 from the computing system 100 of FIG. 1 is shown. In this implementation, the graph cache 200 includes a CAM array 202, a register 204, a multiple match resolver 206, and a RAM array 208. Additionally, the graph cache 200 may include peripheral circuits (not separately illustrated) for operating the various components of the graph cache 200. Example peripheral circuits include read/write circuits for the CAM array 202, read/write circuits for the RAM array 208, a clock circuit for temporalizing operations in the graph cache 200, a control circuit for controlling the components of the graph cache 200, and the like.

As previously noted, an edge is a connection between two adjacent nodes of a graph structure. The graph cache 200 stores a graph structure by storing values that represent the edges of the graph structure. Specifically, the graph cache 200 stores a plurality of edge connections. Each edge connection is a mapping between an identifier of a first node and a memory address for a second node. Thus, each edge connection represents an edge between a first node and a second node. During operation, a target node is provided to the graph cache 200. In response to receiving the identifier of the target node, the graph cache 200 returns the memory addresses for the mapped nodes that are connected to the target node by edges in the graph structure.

The CAM array 202 includes CAM cells 210, search lines SL, and match lines ML. The CAM cells 210 are arranged in rows and columns. The search lines SL are arranged along and correspond to the columns of the CAM cells 210. The match lines ML are arranged along and correspond to the rows of the CAM cells 210. The CAM cells 210 may be ternary CAM (TCAM) cells. A TCAM cell is adapted to store a low value (e.g., a binary 0), a high value (e.g., a binary 1), or a wildcard value. Examples of TCAM cells include SRAM-based TCAM cells, ReRAM-based TCAM cells, memristor-based TCAM cells, and the like.

A row of CAM cells 210 may be referred to as a CAM row 212. Each CAM row 212 stores a vector that includes multiple values (stored in the CAM cells 210 of the CAM row 212). A match line ML corresponds to a CAM row 212. The search lines SL correspond to the CAM cells 210 of the CAM rows 212.

During a write operation, a write vector of values (e.g., voltages) is applied to the CAM cells 210 of a CAM row 212, via bit lines. Each CAM cell 210 of the CAM row 212 may be set to a low value, a high value, or (optionally) a wildcard value, based on a corresponding value of the write vector. Thus, each CAM row 212 has a vector of values stored therein.

During a read operation, a read vector of values (e.g., voltages) is applied to the CAM rows 212, via the search lines SL. Each CAM cell 210 of a CAM row 212 compares its stored value to a corresponding value of the read vector. The CAM rows 212 having stored values that match the corresponding values of the read vector activate their corresponding match lines ML. In other words, during a read operation, the CAM array 202 receives a read vector, searches for the read vector in the CAM rows 212, and activates the match lines ML of the CAM rows 212 that store the read vector. The match lines ML of the CAM rows 212 that store a different vector than the read vector are deactivated.

As subsequently described in greater detail, identifiers for nodes of a graph structure will be stored in the CAM rows 212 of the CAM array 202. An identifier may be a vector of values stored in the CAM cell 210 of a CAM row 212. The CAM array 202 is adapted to receive (on the search lines SL) an identifier of a target node of the graph structure. Additionally, the CAM array 202 is adapted to search for the received identifier in the CAM rows 212, and activate ones of the match lines ML corresponding to the CAM rows 212 that store the identifier. Each of the CAM rows 212 that stores the identifier of the target node corresponds to an edge connecting the target node to neighbor nodes.

The register 204 is connected to the CAM array 202, and specifically, to the match lines ML of the CAM array 202. The register 204 may include multiple latches, such as a latch for each CAM row 212. The register 204 is configured to store a match vector corresponding to the match lines ML of the CAM array 202. Each value of the match vector corresponds to a match line ML, and may be a low value (e.g., a binary 0) or a high value (e.g., a binary 1). Thus, the match vector includes high values (corresponding to the activated match lines ML) and low values (corresponding to the deactivated match lines ML). When a vector is searched for in the CAM array 202 during a read operation, the register 204 is used to latch in the result of the read operation. Thus, the match vector (reflecting the result of the read operation) stored in the register 204 may persist even if the search lines SL are reset.

The multiple match resolver 206 is connected to the register 204. The output of the register 204 may be connected to the input of the multiple match resolver 206. The multiple match resolver 206 is adapted to resolve conflicts that may arise when multiple match lines ML of the CAM array 202 are activated during a read operation. In some implementations, the multiple match resolver 206 is a match token multiple match resolver. However, any suitable network of logic gates may be utilized to implement the multiple match resolver 206. To resolve conflicts during the read operation, the multiple match resolver 206 converts the match vector stored in the register 204 into one or more output vectors.

The multiple match resolver 206 is adapted to serially generate output vectors corresponding to the high values of the match vector. One output vector is generated for each high value in the match vector. Each value of an output vector is a low value, except for the high value of the match vector to which the output vector corresponds. For example, if the match vector includes a first high value and a second high value (corresponding to two activated match lines ML), then two output vectors are generated: a first output vector having one high value corresponding to the first high value of the match vector, and a second output vector having one high value corresponding to the second high value of the match vector. The output vectors will be (serially) provided to the RAM array 208.

The RAM array 208 includes RAM cells 214, word lines WL, and bit lines BL. The RAM cells 214 are arranged in rows and columns. The word lines WL are arranged along and correspond to the rows of the RAM cells 214. The bit lines BL are arranged along and correspond to the columns of the RAM cells 214. The RAM cells 214 may be static random-access memory (SRAM) cells.

A row of RAM cells 214 may be referred to as a RAM row 216. Each RAM row 216 stores a vector that includes multiple values (stored in the RAM cells 214 of the RAM row 216). A word line WL corresponds to a RAM row 216. The bit lines BL correspond to the RAM cells 214 of the RAM rows 216.

During a write operation, a write vector of values (e.g., voltages) is applied to the RAM cells 214 of a RAM row 216, via the bit lines BL and word lines WL. Each RAM cell 214 of the RAM row 216 may be set to a low value or a high value, based on a corresponding value of the write vector. Thus, each RAM row 216 has a vector stored therein.

During a read operation, a word line WL of a RAM row 216 is activated. The RAM cells 214 of that RAM row 216 output their stored vector on the bit lines BL.

The match lines ML of the CAM array 202 are connected (via the register 204 and the multiple match resolver 206) to respective word lines WL of the RAM array 208. The multiple match resolver 206 is adapted to serially activate the word lines WL of the RAM array 208 corresponding to the match lines ML of the CAM array 202 that are activated. In other words, when a match line ML of a CAM row 212 is activated, a corresponding word line WL of a corresponding RAM row 216 is activated, thereby causing that RAM row 216 to output its stored vector on the bit lines BL.

As subsequently described in greater detail, memory addresses will be stored in the RAM rows 216 of the RAM array 208. Each memory address is a location, in an memory external to the graph cache 200, at which a node embedding is stored. When identifiers for nodes of a graph structure are stored in the CAM rows 212 of the CAM array 202, the memory addresses stored in the RAM rows 216 of the RAM array 208 point to embeddings of corresponding neighbor nodes. Specifically, a CAM rows 212 may store an identifier of a target node, and the corresponding RAM row 216 may store a memory address pointing to an embedding of a neighbor node of the target node. Thus, when an identifier of a target node is provided to the CAM array 202, a CAM row 212 containing that identifier activates its match line ML; this causes the word line WL of a corresponding RAM row 216 to be activated, which causes the RAM row 216 to output (on the bit lines BL) the memory address for a neighbor node of the target node.

The graph cache 200 may include ports for external connection. In some implementations, the graph cache 200 further includes an input port 218 and an output port 220. The input port 218 is connected to the search lines SL of the CAM array 202. The output port 220 is connected to the bit lines BL of the RAM array 208.

Figure 3A:
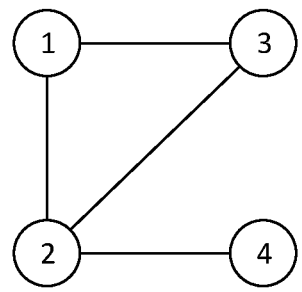
FIGS. 3A-3B illustrate an example of storing a graph structure in a graph cache.
Figure 3B:
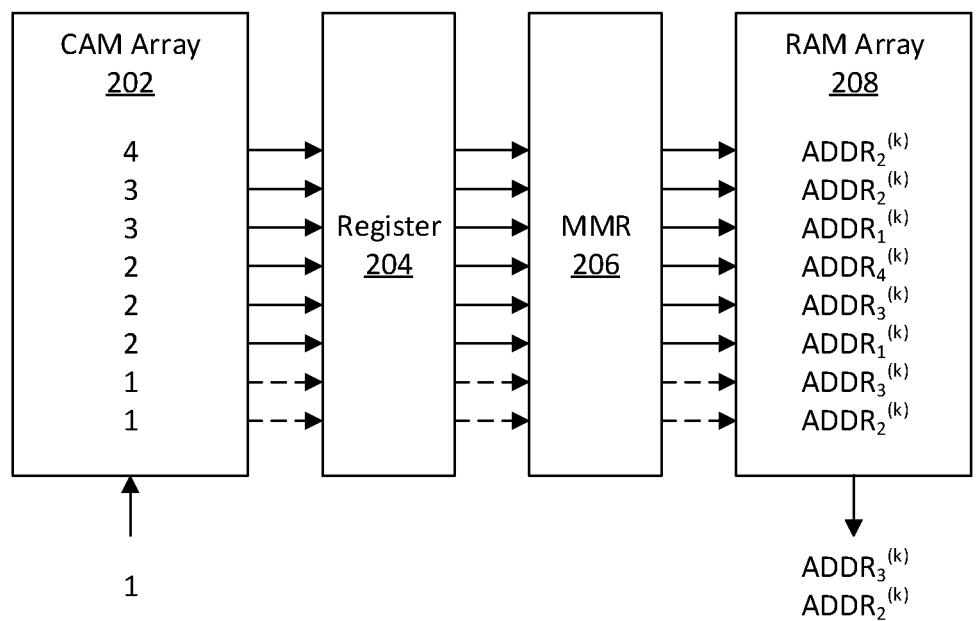

FIGS. 3A-3B illustrate an example of storing a graph structure in a graph cache. FIG. 3A is a diagram of an example graph structure 300, while FIG. 3B is a diagram of the values (representing the graph structure 300) stored in the graph cache 200. The CAM array 202 stores identifiers for nodes of the graph structure 300, while the RAM array 208 stores memory address of embeddings of neighbors of the nodes.

An example of a read operation is also shown in FIG. 3B. In this example, the target node is Node 1 of the graph structure 300. An identifier of the target node (e.g., 1) is provided to the CAM array 202. The rows containing that identifier activate their match lines. The matching outputs of the CAM array 202 are illustrated with dashed lines. As a result of those outputs being activated, the corresponding rows of the RAM array 208 are serially activated (by the multiple match resolver 206), which causes the RAM array 208 to serially output the memory address for neighbor nodes of the target node. In this example where Node 1 is connected to Node 2 and Node 3 in the graph structure 300, providing the identifier for Node 1 to the CAM array 202 causes the RAM array 208 to serially output the memory address for Node 2 ADDR$_2^{(k)}$ and the memory address for Node 3 ADDR$_3^{(k)}$. The embeddings for Node 2 and Node 3 are stored at those memory addresses.

Figure 4:
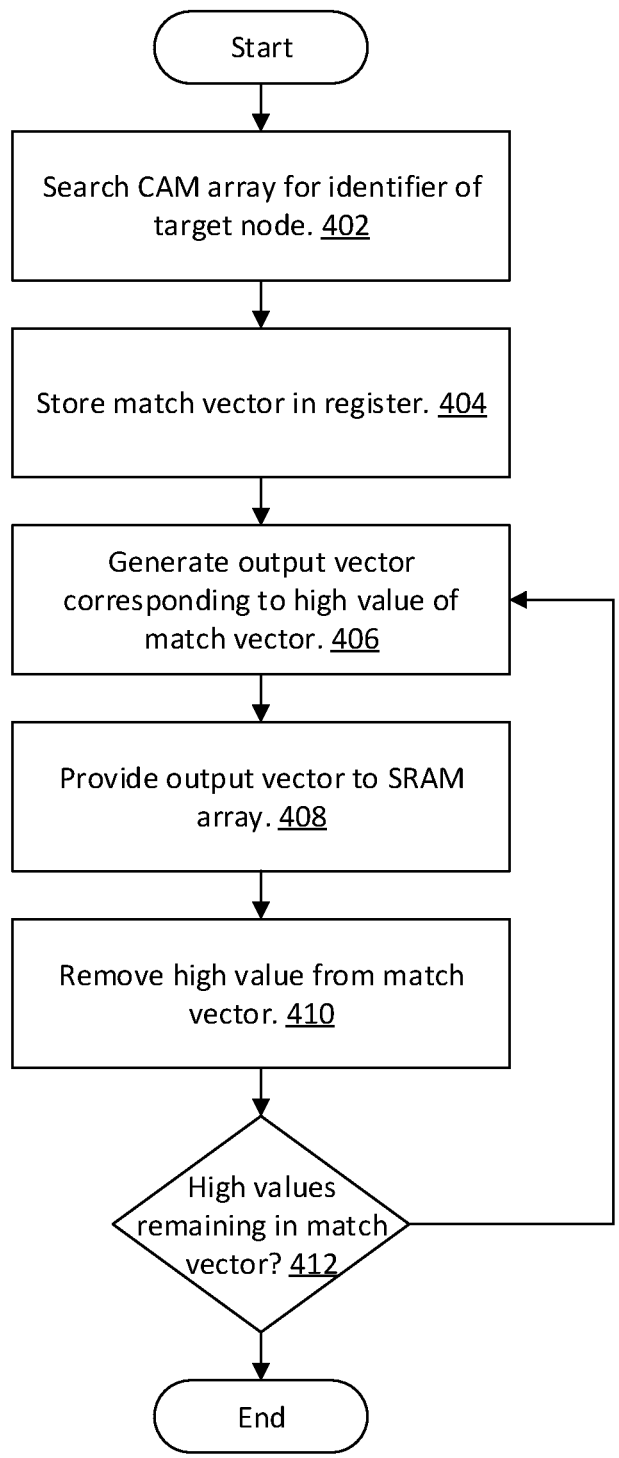
FIG. 4 is a flow diagram of a graph searching method, according to some implementations.

FIG. 4 is a flow diagram of a graph searching method 400, according to some implementations. The graph searching method 400 will be described in conjunction with FIGS. 1 and 2. The graph searching method 400 may be performed by the graph cache 200. Specifically, the graph cache 200 may perform the graph searching method 400 to search for edge connections in a stored graph structure. Responsive to receiving an identifier of a target node, the memory address for each neighbor node of the target node will be returned by the graph cache 200.

The graph cache 200 may perform a step 402 of searching the CAM array 202 for the identifier of the target node. The identifier may be received at the input port 218, and thus may be provided on the search lines SL of the CAM array 202. The identifier may be a vector provided on the search lines SL during a read operation. A match vector is output by the CAM array 202.

The graph cache 200 may perform a step 404 of storing the match vector in the register 204. The match vector has high values corresponding to the CAM rows 212 that store the received identifier, and low values corresponding to the CAM rows 212 that store a different identifier. Each high value in the match vector corresponds to an edge connection between the target node and one of its neighbor nodes. The match vector is provided, by the register 204, to the multiple match resolver 206.

The graph cache 200 may perform a step 406 of generating an output vector. The output vector may be generated by the multiple match resolver 206. The output vector corresponds to one of the high values in the match vector. In some implementations, the output vector corresponds to the high value that is spatially lowest in the match vector. Each value of the output vector is a low value, except for the high value of the match vector to which the output vector corresponds.

The graph cache 200 may perform a step 408 of providing the output vector to the RAM array 208. The output vector may provided, by the multiple match resolver 206, to the word lines WL of the RAM array 208. Because the output vector contains only one high value, only one word line WL is activated by the multiple match resolver 206. The RAM row 216 corresponding to the activated word line WL outputs its stored value (e.g., memory address for a neighbor node) on the bit lines BL. Thus, the memory address may be provided at the output port 220.

The graph cache 200 may perform a step 410 of removing the high value of the output vector from the match vector stored in the register 204. The high value may be removed from the match vector by performing a bitwise AND of the match vector with the inverse of the output vector, and then storing the result of that operation back in the register 204.

The graph cache 200 may perform a step 412 of determining whether any high values remain in the match vector. In response to the match vector containing additional high values, the graph cache 200 repeats steps 406-412. These steps may be iteratively performed until no high values remain in the match vector. The quantity of iterations may be equal to the quantity of high values in the match vector.

An example of a match vector and corresponding output vectors is shown in Table 1. In this example, the target node identifier matches with three CAM rows 212 of the CAM array 202. As a result, the match vector initially stored in the register 204 contains three high values (corresponding to the activated match lines ML of the three CAM rows 212), and so three iterations of steps 406-412 are performed. The output vector generated by the multiple match resolver 206 in each iteration is different. The match vector stored in the register 204 is modified in each iteration.

TABLE 1

| Iteration | Match Vector | Output Vector |
|---|---|---|
| 1 | [0, 0, 1, 0, 1, 0, 1] | [0, 0 ,1, 0, 0, 0, 0] |
| 2 | [0, 0, 0, 0, 1, 0, 1] | [0, 0, 0, 0, 1, 0, 0] |
| 3 | [0, 0, 0, 0, 0, 0, 1] | [0, 0, 0, 0, 0, 0, 1] |

Figure 5:
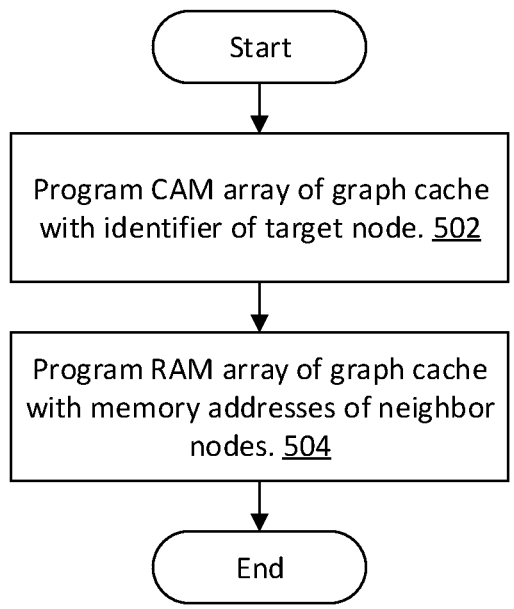
FIG. 5 is a flow diagram of a graph programming method, according to some implementations.

FIG. 5 is a flow diagram of a graph programming method 500, according to some implementations. The graph programming method 500 will be described in conjunction with FIGS. 1 and 2. The graph programming method 500 may be performed by the computing system 100. Specifically, the processor 102 may perform the graph programming method 500 to store an edge of a graph structure (e.g., a mapping of a target node to a neighbor node) in the graph cache 200.

The processor 102 may perform a step 502 of programming the CAM array 202 of the graph cache 200 with an identifier of the target node. The identifier may be a vector that is stored in a CAM row 212 during a write operation for the CAM array 202. The CAM array 202 may be programmed in a similar manner as previously described for FIG. 2.

The processor 102 may perform a step 504 of programming the RAM array 208 of the graph cache 200 with the memory address for the neighbor node. The memory address is a location of the memory 106. The memory address may be a vector that is stored in a RAM row 216 during a write operation for the RAM array 208. The RAM array 208 may be programmed in a similar manner as previously described for FIG. 2.

Multiple edges of the graph structure may be stored in the graph cache 200. Specifically, when the target node has multiple neighbor nodes, the respective memory addresses for the neighbor nodes may be stored in respective RAM rows 216, and the identifier for the target node may be stored in each of the CAM rows 212 that correspond to those RAM rows 216. In other words, multiple CAM rows 212 of the CAM array 202 may be programmed with the identifier of the target node (in step 502) when multiple memory addresses are stored in the RAM array 208 (in step 504).

Figure 6:
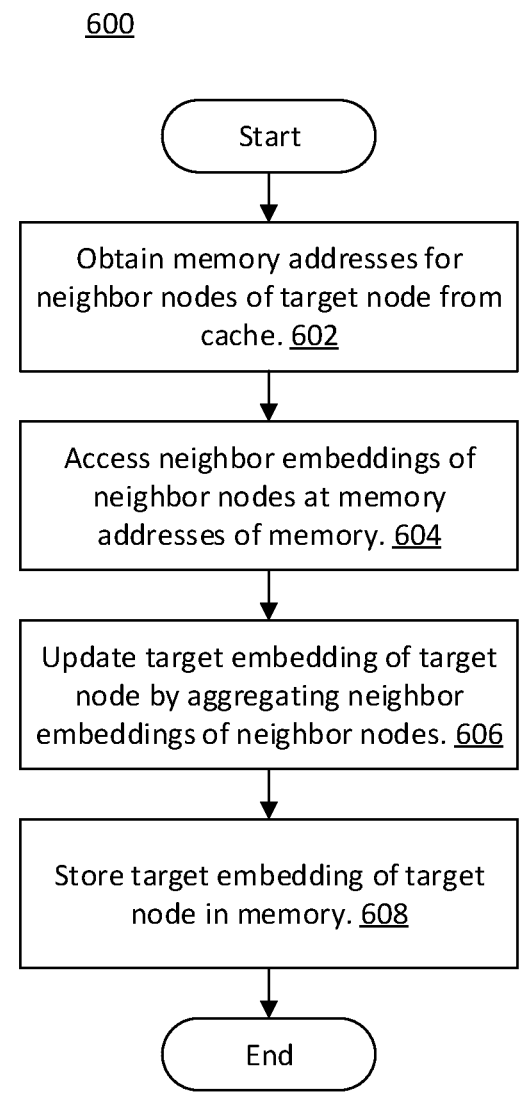
FIG. 6 is a flow diagram of a graph processing method, according to some implementations.

FIG. 6 is a flow diagram of a graph processing method 600, according to some implementations. The graph processing method 600 will be described in conjunction with FIGS. 1 and 2. The graph processing method 600 may be performed by the computing system 100. Specifically, the processor 102 may perform the graph processing method 600 when processing (with a GNN) a graph whose structure is stored in the graph cache 200.

The processor 102 may perform a step 602 of obtaining memory addresses for neighbor nodes of a target node from the graph cache 200. As previously noted, the graph cache 200 stores a graph structure that includes the target node and the neighbor nodes. The processor 102 may provide an identifier of the target node to the graph cache 200, and in response may receive the memory addresses for the neighbor nodes from the graph cache 200. The received memory addresses are locations of the memory 106. As previously noted, the memory 106 is different than the graph cache 200.

In some implementations, obtaining the memory addresses includes searching for the identifier of the target node in the CAM array 202 of the graph cache 200. The match lines ML of some of the CAM rows 212 are activated in response to those CAM rows 212 storing the identifier. The corresponding word lines WL of the RAM rows 216 are activated. The activated word lines WL of the RAM rows 216 correspond to the activated match lines ML of the CAM rows 212. The RAM rows 216 with activated word lines WL store the memory addresses. The word lines WL of the RAM rows 216 may be activated serially (e.g., by the multiple match resolver 206).

The processor 102 may perform a step 604 of accessing neighbor embeddings of the neighbor nodes at the memory addresses of the memory 106. As previously noted, the memory addresses returned by the graph cache 200 are locations of the memory 106. The processor 102 may directly access the node embeddings in those locations of the memory 106.

The processor 102 may perform a step 606 of updating a target embedding of the target node by aggregating the neighbor embeddings of the neighbor nodes. A layer of the GNN may be used to update the target embedding. The updated target embedding of the target node may be based on a previous embedding of the target node as well as the neighbor embeddings of the neighbor nodes.

The processor 102 may perform a step 608 of storing the updated target embedding of the target node in the memory 106. The updated embedding of the target node may be stored back in the memory 106, in the location of the previous embedding of the target node. This updated embedding may then be used when aggregating the neighbor embeddings for other nodes of the graph in a layer of the GNN.

Embodiments may achieve advantages. A graph structure may be stored in the graph cache 200 by storing edge connections. Each edge connection is a mapping between an identifier of a first node and a memory address for a second node. The graph structure may be stored in the CAM array 202 and the RAM array 208. In this manner, the graph structure may be represented more efficiently than in an adjacency matrix. Thus, the amount of memory used by the computing system 100 for processing a graph with a GNN may be reduced.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A graph cache comprising:
a content addressable memory (CAM) array comprising CAM rows and match lines corresponding to the CAM rows, the CAM array configured to receive an identifier of a target node of a graph structure, to search for the identifier in the CAM rows, and to activate ones of the match lines corresponding to the CAM rows that store the identifier;
a random-access memory (RAM) array comprising RAM rows and word lines corresponding to the RAM rows; and
a multiple match resolver connected to the CAM array and to the RAM array, the multiple match resolver configured to serially activate the word lines of the RAM array corresponding to the match lines of the CAM array that are activated.

2. The graph cache of claim 1, wherein the CAM array further comprises search lines, and the CAM array receives the identifier on the search lines.

3. The graph cache of claim 2, further comprising:
an input port connected to the search lines.

4. The graph cache of claim 1, wherein the RAM array further comprises bit lines, and the RAM array is configured to output memory addresses for neighbor nodes of the target node on the bit lines when the word lines are activated.

5. The graph cache of claim 4, further comprising:
an output port connected to the bit lines.

6. The graph cache of claim 1, further comprising:
a register connected to the match lines of the CAM array, an output of the register connected to an input of the multiple match resolver.

7. The graph cache of claim 6, wherein the register is configured to store a match vector comprising high values, the high values corresponding to the match lines of the CAM array that are activated.

8. The graph cache of claim 7, wherein the multiple match resolver is configured to serially generate output vectors corresponding to the high values of the match vector, and to provide the output vectors to the RAM array.

9. The graph cache of claim 1, wherein the multiple match resolver comprises a match token multiple match resolver.

10. The graph cache of claim 1, wherein the CAM rows comprise ternary content-addressable memory cells, and the RAM rows comprise static random-access memory cells.

11. A method, implemented by a computing system, the method comprising:
obtaining memory addresses for neighbor nodes of a target node from a graph cache of the computing system, the graph cache storing a graph structure comprising the target node and the neighbor nodes, the neighbor nodes being connected to the target node in the graph structure, the memory addresses being locations of a memory of the computing system, the memory being different than the graph cache;
accessing neighbor embeddings of the neighbor nodes at the memory addresses of the memory;
updating a target embedding of the target node by aggregating the neighbor embeddings of the neighbor nodes; and
storing the target embedding of the target node in the memory.

12. The method of claim 11, further comprising:
storing the graph structure in the graph cache.

13. The method of claim 12, wherein storing the graph structure in the graph cache comprises:
programming a content addressable memory array of the graph cache with an identifier of the target node; and
programming a random-access memory array of the graph cache with the memory addresses.

14. The method of claim 11, wherein obtaining the memory addresses comprises:
searching for an identifier of the target node in a content addressable memory (CAM) array of the graph cache, match lines of CAM rows of the CAM array being activated in response to the CAM rows storing the identifier; and
activating word lines of a random-access memory (RAM) rows of a RAM array, the word lines of the RAM rows corresponding to the match lines of the CAM rows, the RAM rows storing the memory addresses.

15. The method of claim 14, wherein the word lines of the RAM rows are activated serially.

16. The method of claim 11, wherein obtaining the memory addresses comprises:
provide an identifier of the target node to the graph cache; and
receiving the memory addresses from the graph cache.

17. A computing system comprising:
a processor;
a graph cache; and
a memory, the memory being different than the graph cache, the memory comprising a non-transitory computer readable medium storing instructions which, when executed by the processor, cause the processor to:
store a graph structure in the graph cache;
provide an identifier of a target node of the graph structure to the graph cache;
receive memory addresses for neighbor nodes of the target node from the graph cache, the neighbor nodes being connected to the target node in the graph structure, the memory addresses being locations of the memory;
access neighbor embeddings of the neighbor nodes at the memory addresses of the memory;
update a target embedding of the target node by aggregating the neighbor embeddings of the neighbor nodes; and
store the target embedding of the target node in the memory.

18. The computing system of claim 17, wherein the graph cache has a different architecture than the memory.

19. The computing system of claim 17, wherein the graph cache comprises:
a content addressable memory (CAM) array comprising match lines;
a register connected to the match lines of the CAM array;
a random-access memory (RAM) array comprising word lines; and
a multiple match resolver connected to the word lines of the RAM array, the register connected to the multiple match resolver.

20. The computing system of claim 19, wherein the instructions to store the graph structure in the graph cache comprise instructions to:
program the CAM array with the identifier of the target node; and
program the RAM array with the memory addresses for the neighbor nodes.

* * * * *